United States Patent
Fish et al.

(10) Patent No.: US 8,538,206 B1
(45) Date of Patent: Sep. 17, 2013

(54) HYBRID SILICON ELECTRO-OPTIC MODULATOR

(75) Inventors: Gregory Fish, Santa Barbara, CA (US); Alexander W. Fang, Fremont, CA (US)

(73) Assignee: Aurrion, LLC, Santa Barbara, CA (US)

( * ) Notice: Subject to any disclaimer, the term of this patent is extended or adjusted under 35 U.S.C. 154(b) by 127 days.

(21) Appl. No.: 13/099,730

(22) Filed: May 3, 2011

Related U.S. Application Data

(63) Continuation of application No. 12/774,524, filed on May 5, 2010, now abandoned.

(51) Int. Cl.
*G02F 1/035* (2006.01)

(52) U.S. Cl.
USPC .................................................. 385/2; 385/50

(58) Field of Classification Search
USPC ................. 385/2, 15, 50; 257/14; 372/81
See application file for complete search history.

(56) References Cited

U.S. PATENT DOCUMENTS

| | | | |
|---|---|---|---|
| 6,845,198 B2 | 1/2005 | Montgomery | |
| 7,257,283 B1 * | 8/2007 | Liu et al. | 385/14 |
| 7,408,693 B2 | 8/2008 | Kissa et al. | |
| 7,995,877 B1 * | 8/2011 | Skogen et al. | 385/14 |
| 8,290,014 B2 * | 10/2012 | Junesand et al. | 372/50.1 |
| 2006/0239308 A1 | 10/2006 | Husain et al. | |
| 2007/0170417 A1 | 7/2007 | Bowers | |
| 2007/0291808 A1 | 12/2007 | Ledentsov et al. | |
| 2008/0002929 A1 | 1/2008 | Bowers et al. | |
| 2009/0116523 A1 * | 5/2009 | Leem et al. | 372/44.01 |
| 2009/0190875 A1 * | 7/2009 | Bratkovski et al. | 385/2 |
| 2009/0254298 A1 | 10/2009 | Harke | |
| 2010/0020837 A1 | 1/2010 | Gan | |

OTHER PUBLICATIONS

"Notice of Allowance for U.S. Appl. No. 13/099,748", (May 14, 2013), Whole Document.
"Office Action for U.S. Appl. No. 13/099,748", (Oct. 2, 2012), Whole Document.

* cited by examiner

*Primary Examiner* — Ellen Kim
(74) *Attorney, Agent, or Firm* — Blakely Sokoloff Taylor & Zafman, LLP

(57) ABSTRACT

An electro-optic modulator comprising a first region of silicon material and a second region of non-silicon material. The second region may at least partially overlap the first region to create a lateral overlap region. An optical waveguide of the modulator may be included in the lateral overlap region and comprise of both the silicon and the non-silicon material. The refractive index of at least one of the silicon material and the non-silicon material within the optical waveguide may change based on an electrical difference applied between electrical contacts of the modulator.

21 Claims, 3 Drawing Sheets

HYBRID SILICON ELECTRO-OPTIC MODULATOR

This application is a continuation of U.S. patent application Ser. No. 12/774,524 filed on May 5, 2010 now abandoned and claims priority thereto.

FIELD

Embodiments of the invention generally pertain to photonic circuits, and more particularly to electro-optic modulators based on silicon and III-V semiconductor materials in combination.

BACKGROUND

Optical modulators may be used to electrically modulate light from a light source for optical communication and optical data transmission. The efficiency of an optical modulator (i.e. the aspects of the drive voltage or power requirement of the optical modulator) is fundamentally determined by the electro-optic (EO) materials used to construct the modulator.

Silicon (Si) based optical modulators typically include a PN junction. These modulators rely on free carrier dispersion effects (induced via injection, depletion, accumulation or inversion of carriers) to modulate both the real and imaginary parts of the refractive index of the p-type and n-type silicon near the PN junction. In free carrier absorption modulators, changes in the optical absorption within the modulator are directly transformed into a light output intensity modulation.

Si based optical modulators in forward bias operation typically have limited operating speeds (in the range of 10-50 Mb/s). This operation speed is limited due to the resistance-capacitance time constant product, where the capacitance of the modulator becomes very large due to the reduction in the depletion layer width of the PN junction in forward bias.

To achieve high speed operation (i.e., speeds greater than 10 Gb/s) the PN junctions of silicon based modulators are used in reverse bias to prevent the high capacitance of forward bias operation. This results in modulators requiring an excessive length (several millimeters) and high drive voltages ($V_\pi$>5 V). Improvements in the efficiency of prior art Si based modulators have come from scaling the waveguide dimensions of the modulator to sub-micron geometries and from introducing an insulator between the P and N silicon regions. This insulator allows for accumulation of charge without the increased capacitance of a forward biased junction. However, additional improvements in these areas will be limited as the optical confinement of the PN junction waveguides will degrade as the dimensions are scaled down further, resulting in a drop in efficiency.

III-V semiconductor based optical modulators rely on field based modulation that may achieve up to 50 times the efficiency of Si based modulators at a given length. Unfortunately, there is a tradeoff in III-V based optical modulators as the design has traditionally been either a structure with high electro-optic efficiency, high optical propagation loss and a short length, or a structure with low electro-optic efficiency, low optical propagation loss and a long length.

Thus, both prior art III-V modulator designs have similar bandwidth and drive voltages, and high electro-optic efficiency results in shorter III-V modulators. This limitation stems from the fact that in order to confine the applied electric field maximally to the optical field, prior art III-V based modulators require a PIN (p-type semiconductor-intrinsic semiconductor-n-type semiconductor) junction. P-type III-V semiconductor materials produce an associated optical and microwave loss (due to the p-dopants). If a III-V based modulator uses an NIN (n-type semiconductor-intrinsic semiconductor-n-type semiconductor) junction or Schottky junction to avoid this optical loss, the electro-optic efficiency is degraded due to the additional voltage being dropped across buffer materials that are required to prevent optical loss from the metallic layers. These buffer layers further act as insulating regions that block current flow.

With regards to the cost and size of an optical modulator, silicon materials are easily processed with current techniques, high quality silicon materials are readily available for reasonable a cost, and complex VLSI silicon electronic circuits are readily available. However, silicon-based modulators (or other photonic devices such as lasers) are not as efficient at light emission or absorption as their III-V based counterparts.

Attempts in the prior art have been made to utilize both materials to create photonic devices integrated with Complementary Metal Oxide Semiconductor (CMOS) integrated circuits; however, these attempts have been limited in that electro-optic modulation stems solely from the III-V material, while utilizing the silicon material solely for passive optical wave guiding and/or driving circuitry. Therefore, prior art silicon/III-V photonic integration is limited in that it relies solely on the electro-optic modulation within the III-V region, and thus reduces the potential efficiency and requires the use of p-type dopants within the III-V materials which significantly increase optical and microwave propagation losses.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
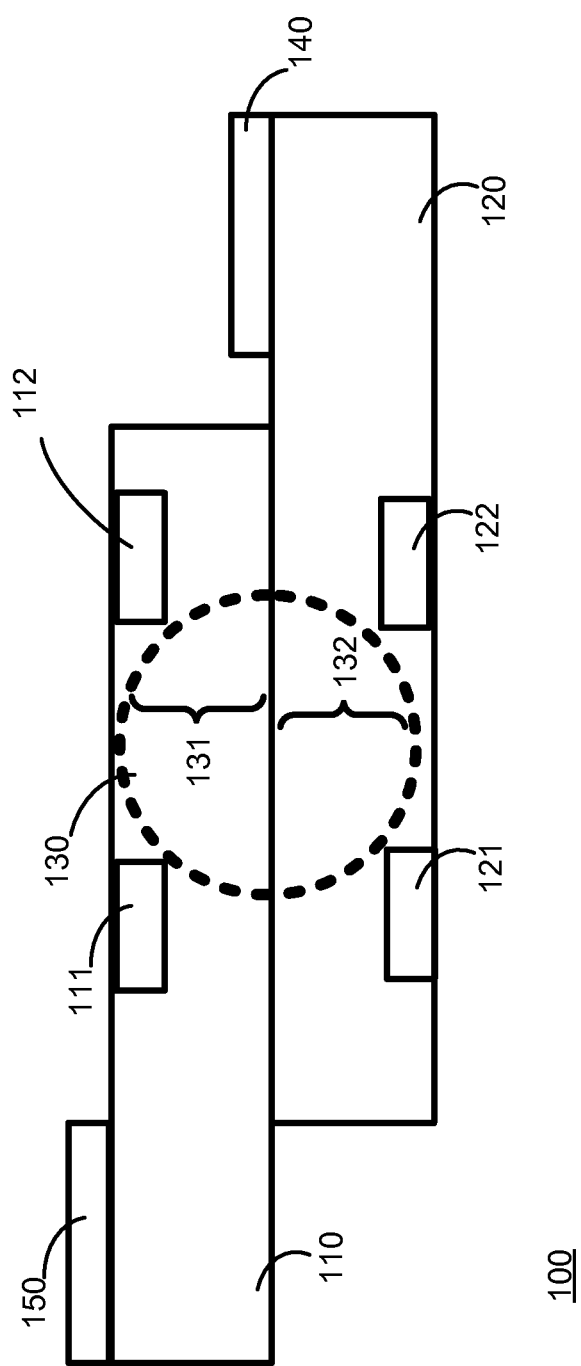
FIG. 1 is a block diagram of a hybrid silicon photonic modulator.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the present invention relate to an electro-optic modulator comprising a first region of silicon material and a second region of non-silicon material with high electro-optic efficiency. Embodiments of the present invention combine the high quality oxide and submicron processing of Si based modulators with materials, such as III-V semiconductors, that have increased electro-optic efficiency.

The non-silicon semiconductor region of a modulator may at least partially overlap the silicon region to create a lateral overlap region. An optical waveguide of the modulator is included in the lateral overlap region and includes both the silicon and the non-silicon material. The refractive index of at least one of the silicon material and the non-silicon material within the optical waveguide may change based on an electrical difference applied between electrical contacts of the modulator.

In one embodiment, the non-silicon material is a group III-V semiconductor material. III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials for bandgaps closer to the wavelength of the light being modulated, as electron speed in III-V semiconductors is much faster than that in silicon. Thus, III-V semiconductor materials enable photonic operation with an increased efficiency at generating light from electricity and converting light back into electricity.

The low optical loss and high quality oxides of silicon are thus combined with the electro-optic efficiency of III-V semiconductors. In one embodiment, the first and second regions of a modulator are doped with complementary dopants. In this embodiment, a voltage is applied to the electrodes of the modulator to modulate the refractive index of at least one of the silicon region and the non-silicon region of the optical waveguide. In one embodiment, the silicon region of the modulator is doped with p-type dopants while the non-silicon material is doped with n-type dopants.

In another embodiment, the silicon and III-V semiconductor regions of the above modulator are each doped with a dopant. To avoid the optical and microwave losses associated with p-type doped high electro-optic efficiency semiconductor materials, the silicon region of the modulator and at least a portion of the non-silicon region of the modulator may be doped with n-type dopants. An electrical field may be applied across an undoped or slightly doped layer in the non-silicon region of the modulator to modulate the refractive index of the waveguide. For enhanced electro-optic efficiency, the undoped portion of the upper slab may include quantum wells to make use of the Quantum Confined Stark Effect (QCSE).

FIG. 1 is block diagram of a hybrid silicon photonic modulator. It is to be understood that there exist various processing techniques that may be used to form the device as shown. Accordingly, the inventive structure may be formed using any acceptable process sequence that yields the various device elements, element positions and associated doping levels required for acceptable operation.

Modulator 100 includes silicon region 120 and overlapping non-silicon region 110. Within the overlapped region is optical waveguide 130, which includes both the silicon and non-silicon semiconductor material as illustrated by upper section 131 (comprising the non-silicon material) and lower section 132 (comprising the silicon material). The circular shape of optical waveguide 130 in FIG. 1 is for illustrative purposes only. It will be understood that the shape and size of an optical waveguide is the result of optical confinement properties of regions 110 and 120.

In the illustrated embodiment, optical confinement of optical waveguide 130 is created by physical aspects of non-silicon region 110 and silicon region 120. In this embodiment, the vertical confinement of optical waveguide 130 is the result of the height regions 110 and 120. The horizontal confinement is the result confinement regions 111 and 112 included in region 110, and confinement regions 121 and 122 included in region 120. In this embodiment, said confinement regions are insulating regions. In other embodiments, said confinement regions may be of any material with a lower refractive index than waveguide 130, and may result from etching and re-growth or oxidation or other suitable techniques.

Modulator 100 further includes electrode 140 coupled to silicon region 120, and electrode 150 coupled to non-silicon region 110. The (real and imaginary) refractive index of at least one of waveguide section 131 and 132 may change based on an electrical difference applied to electrodes 140 and 150. Said changes to the refractive index (or indexes) are proportional to the strength of the electrical difference applied to electrodes 140 and 150.

The electrical difference applied to electrodes 140 and 150 may be an electrical voltage or an electrical field. The photonic and electronic interaction of regions 110 and 120 during application of said electrical difference will actively modulate light travelling through optical waveguide 130. For example, applying a voltage to electrodes 140 and 150 to reverse bias or forward bias modulator 100 may change the refractive index of at least one of waveguide sections 131 and 132.

The use of a III-V semiconductor material in modulator 100 provides for a more efficient modulator compared to a modulator made of only silicon semiconductor material. It will be understood that use of III-V semiconductor material allows for reverse bias operation of modulator 100 (i.e., applying positive voltage to region 110 and negative voltage to region 120) using a low drive voltage and a short device length (due to high electro-optic efficiency of III-V semiconductors).

In another embodiment, modulator 100 may further include a dielectric layer deposed between regions 110 and 120. Said dielectric layer may be any material with a wide bandgap and high stability under exposure to electrical fields to prevent current from flowing between electrodes 140 and 150. In one embodiment, said dielectric layer is a silicon dioxide (SiO2) layer.

Said dielectric layer reduces the creation of a large capacitance associated with forward bias operation of modulator 100 (i.e., applying negative voltage to region 110 and positive voltage to region 120) by blocking carrier transport between regions 131 and 132. Thus, said dielectric later provides for efficient transport of carriers into and out of waveguide 130, allowing for relatively fast charging/discharging for high speed performance.

Therefore, the example embodiment of modulator 100 illustrates combining the high electro-optic efficiency of III-V materials with the high quality oxide and submicron processing of Si based modulators. Regions 110 and 120 may be doped either with similar or complementary dopants. In embodiments where non-silicon slab 110 is doped with n-type dopants, the optical losses associated with p-doping are eliminated.

As illustrated in FIG. 1, optical waveguide 130 is included in the overlap of regions 110 and 120. In another embodiment, geometrical aspects of the non-silicon and silicon regions may further determine the dimensions of an optical waveguide of a modulator. This allows for the creation of optical waveguides scaled to sub-micron dimensions.

Figure 2:
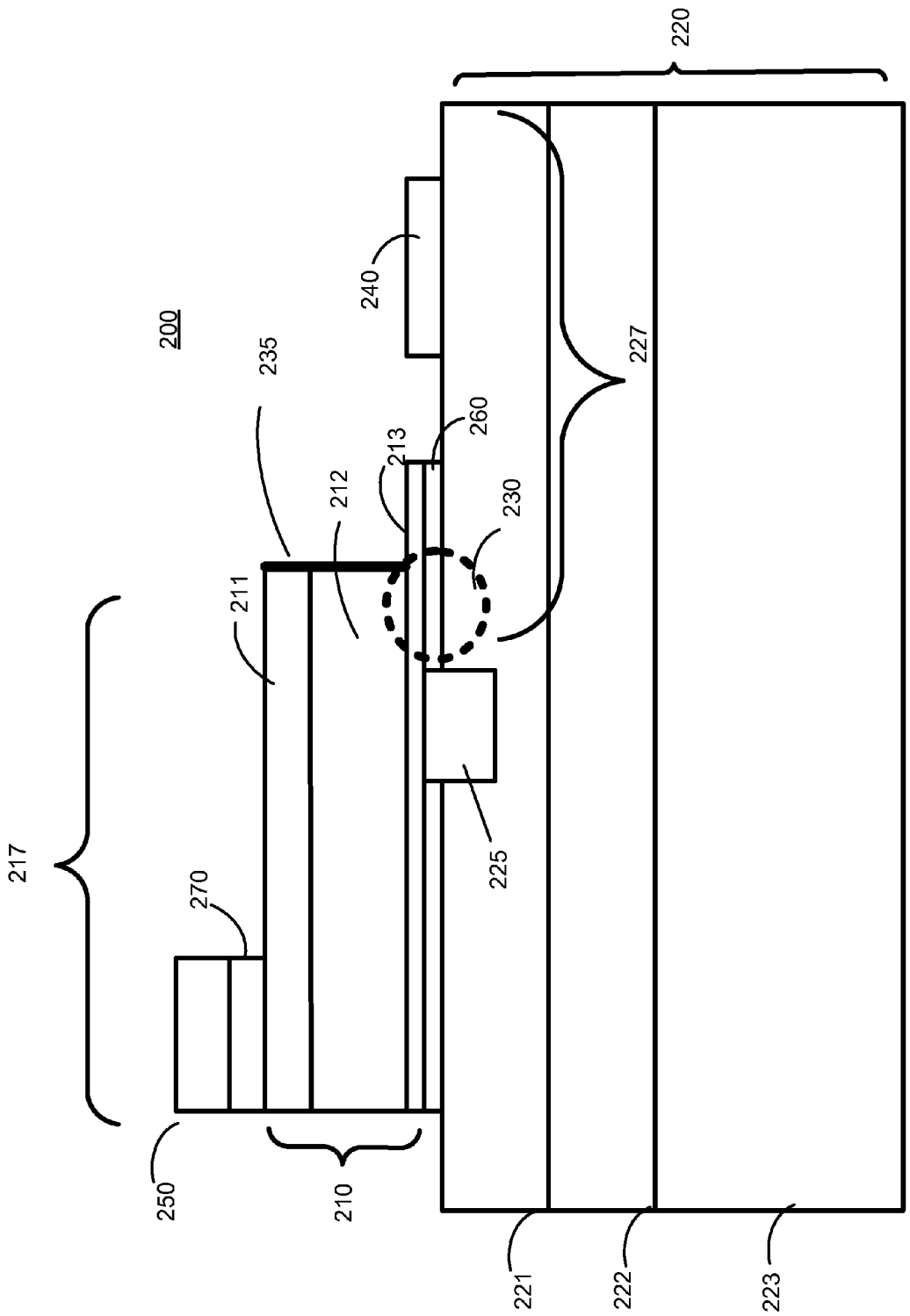
FIG. 2 is a block diagram of an asymmetric hybrid silicon photonic modulator.

FIG. 2 is a block diagram of an asymmetric hybrid silicon photonic modulator. Modulator 200 includes upper non-silicon semiconductor slab 210 and lower silicon semiconductor slab 220. In this embodiment, silicon slab 220 includes doped silicon region 221, SiO2 region 222 and Silicon on Insulator (SOI) wafer 223. Silicon slab 220 may further include etched trench 225. Said trench is etched to define lower slab region 227 to (partially) guide optical mode 230 and to form a barrier for the conduction of charge along silicon slab 220.

It is to be understood that in other embodiments, the region including etched trench 225 may instead be any region that creates "a void of light" in slab 220. For example, said region may be an oxidized portion of lower slab 220, a broad band optical grating, or any similar structure. In other embodiments, said region may be an anti-resonant structure. For example, said region may be a photonic bandgap structure (e.g., a photonic crystal). Thus, said region may be any functional equivalent of an optical boundary known in the art.

Silicon slab 220 may be doped either entirely or selectively using methods common in CMOS fabrication processes (e.g. epitaxial growth or implantation and activation). In one embodiment, after silicon slab 220 is etched and doped, oxide layer 260 is "grown" over silicon slab 220 to form a gate dielectric to prevent the conduction of current between electrodes 240 and 250 (said current would result from an electrical difference applied to electrodes 240 and 250).

Non-silicon slab 210 may be bonded to oxide layer 260 via any technique known in the art (e.g., heat fusion, adhesive bonding). Non-silicon slab 210 may be a non-silicon semiconductor material that has a high electro-optic efficiency due to free carrier dispersion properties (e.g., III-V semiconductor material).

Non-silicon slab 210 includes upper slab region 217. This region may be shaped by etching away material to confine the conduction of electrical charge within upper slab region 217. In one embodiment, upper slab region is further shaped to form an optical boundary—i.e., edge 235 of upper slab 210 (in FIG. 2, edge 235 is "bolded" for illustrative purposes only) for an optical waveguide that supports optical mode 230. Thus, optical mode 230 is included where upper slab region 217 overlies lower slab region 227. The optical waveguide that supports optical mode 230 is horizontally confined by trench 225 and edge 235, and vertically confined by SiO2 layer 222 and cladding layer 211 (described below).

FIG. 2 illustrates upper slab region 217 overlapping lower slab region 227 asymmetrically with respect to optical mode 230 (as opposed to FIG. 1, wherein the active regions of slabs 110 and 120 overlap symmetrically). This geometry provides an optical waveguide barrier in each of non-silicon slab 210 (i.e., edge 235) and silicon slab 220 (i.e., trench 225). For example, varying the size (and/or the shape) of optical mode 230 would only require adjusting the overlap of upper slab region 217 and lower slab region 227 to change the "position" of waveguide barriers 225 and 235. Furthermore, the illustrated novel geometry, in conjunction with oxide layer 260, reduces voltage drop across charge blocking regions to enable high electro-optic efficiency modulators to be made longer to realize lower drive voltages without excessive optical insertion loss.

In one embodiment, contact layer 270 is disposed between electrode 250 and upper slab region 217. Contact layer 270 is utilized to facilitate the creation of ohmic contacts to upper slab region 217 under the electrode 250. To prevent unwanted optical loss during modulation, contact layer 270 should be formed to be an appropriate distance from the proximity of optical mode 230. Contact layer 270 may comprise Indium Gallium Arsenide (InGaAs) or other similar semiconductor material with superior electron velocity with respect to upper slab region 217.

In one embodiment, doped silicon region 221 comprises p-doped silicon. In this embodiment, the layered arrangement of upper slab region/gate dielectric/lower slab region may form a semiconductor-insulator-semiconductor (SIS) capacitor wherein an electrical voltage or field applied to the electrode 240 (coupled to doped silicon region 221) and 250 may modify the free carrier concentration in the semiconductor regions that overly. This modification of the free carrier concentration, specifically within optical mode 230, may cause modulation of light within the optical waveguide of modulator 200.

In another embodiment, doped silicon region 221 comprises n-doped silicon, thus avoiding high optical and microwave loss that results from modulating in p-type doped semiconductors. In this embodiment, electro-optic modulation of modulator 200 is created via an electric field that is applied across one or more layers (i.e., layers 211-213) of upper slab region 217. In this alternative embodiment, upper slab region 217 contains one or more active layers (such as layer 212) that are non-intentionally doped or lightly doped compared to silicon slab 220 and layer 211 (which may serve as a cladding layer).

Active layer 212 is of a III-V semiconductor with high electro-optic efficiency—i.e., the absorption coefficient of said layer is easily affected by either the Franz-Keldysh effect if said layer comprises bulk material (e.g., intrinsic Indium Gallium Arsenide Phosphide (i-InGaAsP) or Indium Aluminum Gallium Arsenide (InAlGaAs)) or the QCSE if said layer comprises multiple quantum wells (MQW).

Cladding layer 211 is of a material that has a bandgap greater than electro-optically efficient active layer 212 and contact layer 270. Thus, cladding layer 211 ensures the electric field is formed across active layer 212 and contact layer 270 if said layers are doped to facilitate the formation of ohmic contacts. In one embodiment, cladding layer 211 is of N-doped Indium Phosphide, and layer 213 is an n-type layer.

Figure 3:
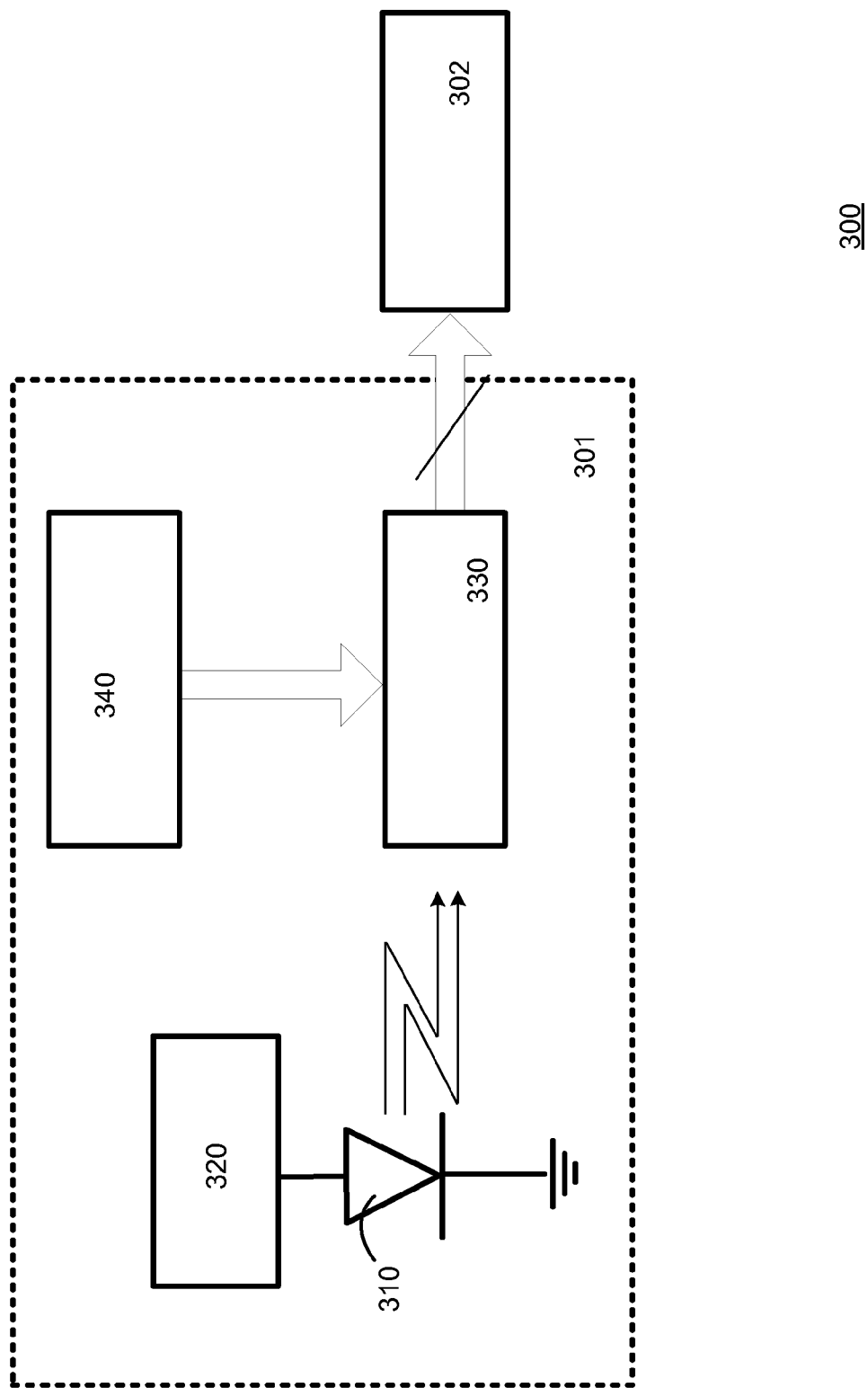
FIG. 3 is a block diagram of a simplified optical system utilizing an embodiment of the invention.

FIG. 3 is a block diagram of a simplified optical system utilizing an embodiment of the invention. System 300 includes transmitter 301 and receiver 302. Transmitter 301 includes light source 310 and light source controller 320. In the illustrated embodiment, light source 320 is a laser. In one embodiment, light source controller 320 comprises silicon circuitry while light source 310 may comprise any combination of III-V and silicon semiconductor material. Light source 310 may transmit optical signals to modulator 330 via any transmission medium known in the art.

Modulator 330 may comprise any of the embodiments described above. Modulator 330 may perform either amplitude or phase modulation of the light received from light source 310. In one embodiment, optical waveguides of modulator 330 are controlled by modulator controller 340 (i.e., modulator controller 340 may create an electrical difference at electrical contacts of modulator 330). The modulated output of modulator 330 may be transmitted to receiver 302 via any transmission medium known in the art.

As described above, modulator 330 may comprise silicon and III-V semiconductor material. In one embodiment, system 300 is included in a single device or chip, wherein silicon components of system 300 are included on a silicon portion of the chip, and III-V semiconductor components of system 300 are included on a III-V portion of the chip. Said portions may be fabricated independently and subsequently bonded via any bonding process known in the art.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. A modulator comprising:
a first region of silicon semiconductor material;
a second region of non-silicon semiconductor material, the second region above and to at least partially overlap the first region to create a lateral overlap region;
a first and a second electrical contacts coupled to the first region and the second region, respectively; and
an optical waveguide of the modulator to receive light, included in the lateral overlap region and comprising the silicon semiconductor material and the non-silicon semiconductor material, the optical waveguide to modulate the received light based on changes to the absorption coefficient of at least one of the semiconductor materials of the optical waveguide via an electric field generated by an electrical difference applied between the first and second electrical contacts.

2. The modulator of claim 1, wherein the non-silicon semiconductor material comprises a III-V semiconductor material.

3. The modulator of claim 1, further comprising a dielectric layer disposed between the overlap of the first and second regions to prevent electric current flow between the first and second electrical contacts.

4. The modulator of claim 1, wherein the first and second regions are doped with complementary dopants, and the electrical difference applied between the first and second electrical contacts comprises a voltage applied to the first and second electrical contacts.

5. The modulator of claim 3, wherein the first region and a first portion of the second region are doped with a same dopant, and the electrical difference applied between the first and second electrical contacts comprises an electrical field further applied to a second, non-doped portion of the second region.

6. The modulator of claim 5, wherein the same dopant comprises an n-type dopant.

7. The modulator of claim 1, wherein the first region and the second region overlap symmetrically with respect to the optical waveguide.

8. The modulator of claim 1, wherein the first region and the second region overlap asymmetrically with respect to the optical waveguide.

9. The modulator of claim 1 further comprising a contact layer formed between the second region and the second electrical contact to enhance the creation of ohmic contacts below the second electrical contact in a portion of the second region.

10. The modulator of claim 9, wherein the contact layer comprises p-type Indium Gallium Arsenide (p-InGaAs).

11. The modulator of claim 10, wherein the second region of non-silicon semiconductor material further comprises
a cladding layer below the contact layer, the cladding layer to confine an optical mode of the optical waveguide;
an active layer below the cladding layer, the active layer to include an active region; and
an n-type layer between the active layer and the first region of silicon semiconductor material.

12. The modulator of claim 11, wherein the cladding layer comprises N-doped Indium Phosphide (N InP).

13. The modulator of claim 11, wherein the active layer comprises at least one of intrinsic Iridium Gallium Arsenide Phosphide (i-InGaAsP) and Indium Aluminum Gallium Arsenide (InAlGaAs).

14. The modulator of claim 11, wherein the active layer comprises a multiple quantum well (MQW) layer.

15. A method comprising:
receiving light from a light source at a modulator;
applying an electrical difference between a first and a second electrical contact of the modulator to generate an electric field for modulating the received light in an optical waveguide of the modulator based on changes to the absorption coefficient of at least one of the semiconductor materials of the optical waveguide, the modulator to further include
a first region of silicon semiconductor material, and a second region of non-silicon semiconductor material, the second region above and to at least partially overlap the first region to create a lateral overlap region.

16. The method of claim 15, wherein the non-silicon semiconductor material comprises a III-V semiconductor material.

17. The method of claim 15, wherein the modulator further comprises a dielectric layer disposed between the overlap of the first and second regions to prevent electric current flow between the first and second electrical contacts.

18. The method of claim 15, wherein the first and second regions of the modulator are doped with complementary dopants, and applying the electrical difference between the first and second electrical contacts comprises
applying an electrical voltage to the first and second electrical contacts.

19. The method of claim 15, wherein the first region and a first portion of the second region of the modulator are doped with an n-type dopant, and applying the electrical difference between the first and second electrical contacts comprises
applying an electrical field to the first and second electrical contacts.

20. The modulator of claim 13, wherein the changes to the absorption coefficient of at least one of the semiconductor materials of the optical waveguide is due to a Franz-Keldysh effect.

21. The modulator of claim 14, wherein the changes to the absorption coefficient of at least one of the semiconductor materials of the optical waveguide is due to a quantum confined stark effect (QCSE).

* * * * *